(12) United States Patent
Aoi (10) Patent No.: US 7,960,489 B2
(45) Date of Patent: Jun. 14, 2011

(54) INTERLAYER INSULATING FILM, METHOD FOR FORMING THE SAME AND POLYMER COMPOSITON

(75) Inventor: Nobuo Aoi, Hyogo (JP)

(73) Assignee: Panasonic Corporation, Osaka (JP)

( * ) Notice: Subject to any disclaimer, the term of this patent is extended or adjusted under 35 U.S.C. 154(b) by 990 days.

(21) Appl. No.: 11/798,218

(22) Filed: May 11, 2007

(65) Prior Publication Data

US 2007/0213488 A1  Sep. 13, 2007

Related U.S. Application Data

(62) Division of application No. 10/622,515, filed on Jul. 21, 2003, now Pat. No. 7,232,874.

(30) Foreign Application Priority Data

Aug. 6, 2002 (JP) ................. 2002-229013

(51) Int. Cl.
*C08F 138/02* (2006.01)
*C08F 238/02* (2006.01)
*C08F 38/02* (2006.01)

(52) U.S. Cl. ......... 526/285; 526/308; 526/309; 526/316
(58) Field of Classification Search .............. 526/285, 526/316, 308, 309
See application file for complete search history.

(56) References Cited

U.S. PATENT DOCUMENTS 2,232,867 A * 2/1941 Reppe et al. ................. 568/874

FOREIGN PATENT DOCUMENTS

| EP | 1 170 273 A1 | * | 1/2002 |
| JP | 2001-332543 | * | 11/2001 |
| JP | P2001-332543 A | | 11/2001 |
| WO | WO 97/22631 | | 6/1997 |

* cited by examiner

*Primary Examiner* — Ling-Siu Choi
(74) *Attorney, Agent, or Firm* — McDermott Will & Emery LLP (57) ABSTRACT

The interlayer insulating film of this invention is composed of a polymer in which a first monomer having four substituted acetylenyl groups and polymerizable in the three-dimensional direction and a second monomer having two substituted cyclopentanonyl groups and polymerizable in the two-dimensional direction are three-dimensionally polymerized.

4 Claims, 7 Drawing Sheets

Chemical Formula 3:

FIG. 4

Chemical Formula 5:

FIG. 5

Chemical Formula 8:

FIG. 6

Chemical Formula 10:

FIG. 7

INTERLAYER INSULATING FILM, METHOD FOR FORMING THE SAME AND POLYMER COMPOSITON

RELATED APPLICATIONS

This application is a divisional of application Ser. No. 10/622,515, filed Jul. 21, 2003, now U.S. Pat. No. 7,232,874, which claims priority of Japanese Application No. 2002-229013, filed Aug. 6, 2002, the contents of which are hereby incorporated by reference.

BACKGROUND OF THE INVENTION

The present invention relates to an interlayer insulating film, a method for forming the interlayer insulating film and a polymer composition for use in a multilayer interconnect structure of a semiconductor integrated circuit device.

In accordance with the development for increasing the degree of integration of semiconductor integrated circuits, the performance of the semiconductor integrated circuits cannot be smoothly improved because of increase of interconnect delay time derived from increase of capacitance between interconnects, that is, parasitic capacitance between metal interconnects. The interconnect delay time is in proportion to a product of the resistance of metal interconnects and capacitance between the interconnects and corresponds to what is called RC delay.

Accordingly, in order to reduce the interconnect delay time, it is necessary to reduce the resistance of the metal interconnects or reduce the capacitance between the interconnects.

A technique to use copper or copper alloy instead of aluminum-based alloy as an interconnect material for reducing the resistance of the metal interconnects has been reported. Since copper or copper alloy has resistivity as small as approximately ⅔ of that of an aluminum-based alloy material, when a copper material is used as the interconnect material, the interconnect delay time simply calculated is reduced to ⅔ of that attained when an aluminum-based alloy material is used, which results in an operation speed 1.5 times as high as that attained by using the aluminum-based alloy material.

When the degree of integration of semiconductor integrated circuits is further increased, however, even in the case where metal interconnects of a copper material are used, there is a fear that the operation speed may be limited due to the increase of the interconnect delay time. Also, when used as the interconnect material, copper has small resistivity ranking next to silver, but even when metal interconnects of silver are used instead of copper interconnects, the interconnect resistance is reduced merely slightly.

On the other hand, in order to reduce the capacitance between interconnects, it is necessary to lower the dielectric constant of an interlayer insulating film. A conventional interconnect insulating film is made of a silicon oxide film, and the silicon oxide film has a dielectric constant of approximately 4 through 4.5. Therefore, it is difficult to use the silicon oxide film as an interlayer insulating film of a semiconductor integrated circuit with a higher degree of integration.

Accordingly, as an interlayer insulating film having a dielectric constant lower than the silicon oxide film, a fluorine-containing silicon oxide film, a low dielectric constant SOG film, an organic polymer film and a porous film have been proposed.

Among these interlayer insulating films having low dielectric constants, a porous film is regarded as a promising film because it can remarkably lower the dielectric constant. When a porous film is used, the quantity of pores introduced into the film (porosity) is increased so as to realize a low dielectric constant.

When the porosity is increased, however, although the dielectric constant can be lowered, the mechanical characteristic (such as elastic modulus, hardness or an adhesion property) is largely degraded. When the mechanical characteristic is degraded, there is a fear of peeling or destruction of the film caused by a variety of stress occurring during integration process. The various stress herein are, for example, thermal stress caused in metal CMP (chemical mechanical polishing) for forming copper interconnects or annealing performed during the process and stress caused in bonding.

The elastic modulus required of an interlayer insulating film used in a semiconductor integrated circuit is at least 3 GPa or more, and the elastic modulus of a porous film with a dielectric constant of 2 or less is much lower than 3 GPa.

Therefore, in order to solve this problem, a porous silica film with high regularity or a three-dimensional organic polymer film with a diamond structure has been recently proposed.

A porous silica film with high regularity can attain elastic modulus of 10 GPa or more by regularly forming, in the film, honey comb structures each with an opening of several nm.

Also, a three-dimensional organic polymer film with a diamond structure is formed through self-organized polymerization of a two-dimensionally polymerized monomer and a three-dimensionally polymerized monomer each having a diamond structure, and can realize improvement of isotropic mechanical strength. Also, a three-dimensional polymer film with a dielectric constant of 2 or less can attain elastic modulus of approximately 10 GPa.

A porous silica film with high regularity has, however, a problem of high hygroscopicity as well as a problem that a method for forming this film is complicated because it is necessary to make the inner wall of each pore hydrophobic. Furthermore, due to its honey comb structure, the mechanical strength is anisotropic, and its elastic modulus along a direction with small mechanical strength is substantially the same as that of a conventional porous film.

On the other hand, a three-dimensional organic polymer film with a diamond structure has a bonding with high polarity in the molecular structure of the polymer. Specifically, a three-dimensional organic polymer film with a diamond structure has a polyimide structure, a polyimidazole structure or a polyoxazole structure, and such a structure has nitrogen or oxygen designated as a hetero atom. C=O of the polyimide structure, N—H of the polyimidazole structure and —O— of the polyoxazole structure all have high polarizability and an effect to increase the dielectric constant as well as a function to increase the hygroscopicity.

Accordingly, in order to lower the dielectric constant of a three-dimensional organic polymer film with a diamond structure, it is necessary to reduce the density, but when the density is reduced, the mechanical strength is disadvantageously lowered.

SUMMARY OF THE INVENTION

In consideration of the aforementioned conventional problems, an object of the invention is providing an interlayer insulating film with a low dielectric constant, low hygroscopicity and high mechanical strength and a method for forming the same, and providing a polymer composition with a low dielectric constant, low hygroscopicity and high mechanical strength.

In order to achieve the object, a diamond structure of a three-dimensional organic polymer film is composed of carbon and hydrogen alone according to this invention, which is specifically practiced as follows:

The first interlayer insulating film of this invention is composed of a polymer in which a first monomer having four substituted acetylenyl groups and polymerizable in the three-dimensional direction and a second monomer having two substituted cyclopentanonyl groups and polymerizable in the two-dimensional direction are three-dimensionally polymerized.

In the first interlayer insulating film, the polymer composing the first interlayer insulating film is made from carbon and hydrogen alone and includes neither nitrogen nor oxygen. Therefore, the polymer has small polarizability, so that the dielectric constant of the first interlayer insulating film can be low and its hygroscopicity can be small. Furthermore, since the first interlayer insulating film has a low dielectric constant, there is no need to further reduce the density, and hence, degradation of the mechanical strength can be avoided.

In the first interlayer insulating film, the first monomer can be an adamantane derivative having four substituted acetylenyl groups or a methane derivative having two substituted acetylenyl groups.

In the first interlayer insulating film, the second monomer can be an aromatic derivative having two substituted cyclopentanonyl groups.

The second interlayer insulating film of this invention is composed of a polymer in which a first monomer having four substituted acetylenyl groups and polymerizable in the two-dimensional direction and a second monomer having two substituted cyclopentanonyl groups and polymerizable in the three-dimensional direction are three-dimensionally polymerized.

In the second interlayer insulating film, the polymer composing the second interlayer insulating film is made from carbon and hydrogen alone and includes neither nitrogen nor oxygen. Therefore, the polymer has small polarizability, so that the dielectric constant of the second interlayer insulating film can be low and its hygroscopicity can be small. Furthermore, since the second interlayer insulating film has a low dielectric constant, there is no need to further reduce the density, and hence, degradation of the mechanical strength can be avoided.

In the second interlayer insulating film, the first monomer can be an aromatic derivative having four substituted acetylenyl groups.

In the second interlayer insulating film, the second monomer can be an adamantane derivative having two substituted cyclopentanonyl groups or a methane derivative having two substituted cyclopentanonyl groups.

The first method for forming an interlayer insulating film of this invention includes the steps of preparing an oligomer by polymerizing, in a liquid phase, a first monomer having four substituted acetylenyl groups and polymerizable in the three-dimensional direction and a second monomer having two substituted cyclopentanonyl groups and polymerizable in the two-dimensional direction; and causing polymerization after applying the oligomer on a substrate, whereby forming an interlayer insulating film made from a polymer in which the first monomer and the second monomer are three-dimensionally polymerized.

In the first method for forming an interlayer insulating film, the polymer composing the interlayer insulating film is made from carbon and hydrogen alone and includes neither nitrogen nor oxygen. Therefore, the polymer has small polarizability, so that the dielectric constant of the interlayer insulating film can be low and its hygroscopicity can be small. Furthermore, since the interlayer insulating film has a low dielectric constant, there is no need to further reduce the density, and hence, degradation of the mechanical strength can be avoided.

The second method for forming an interlayer insulating film of this invention includes the steps of preparing an oligomer by polymerizing, in a gas phase, a first monomer having four substituted acetylenyl groups and polymerizable in the three-dimensional direction and a second monomer having two substituted cyclopentanonyl groups and polymerizable in the two-dimensional direction; and causing polymerization after depositing the oligomer on a substrate, whereby forming an interlayer insulating film made from a polymer in which the first monomer and the second monomer are three-dimensionally polymerized.

In the second method for forming an interlayer insulating film, the polymer composing the interlayer insulating film is made from carbon and hydrogen alone and includes neither nitrogen nor oxygen. Therefore, the polymer has small polarizability, so that the dielectric constant of the interlayer insulating film can be low and its hygroscopicity can be small. Furthermore, since the interlayer insulating film has a low dielectric constant, there is no need to further reduce the density, and hence, degradation of the mechanical strength can be avoided.

In the second method for forming an interlayer insulating film, polymerization performed in a gas phase for preparing the oligomer can be a thermal polymerization reaction or a plasma polymerization reaction.

In the first or second method for forming an interlayer insulating film, the first monomer can be an adamantane derivative having four substituted acetylenyl groups or a methane derivative having a substituted acetylenyl group.

In the first or second method for forming an interlayer insulating film, the second monomer can be an aromatic derivative having two substituted cyclopentanonyl groups.

In the first or second method for forming an interlayer insulating film, a substituent of the substituted acetylenyl group can be an aromatic derivative.

In the first or second method for forming an interlayer insulating film, a substituent of the substituted cyclopentanonyl group can be an aromatic derivative.

In the case where the substituent is an aromatic derivative, the aromatic derivative can be benzene, naphthalene, anthracene or biphenyl.

The third method for forming an interlayer insulating film of this invention includes the steps of preparing an oligomer by polymerizing, in a liquid phase, a first monomer having four substituted acetylenyl groups and polymerizable in the two-dimensional direction and a second monomer having two substituted cyclopentanonyl groups and polymerizable in the three-dimensional direction; and causing polymerization after applying the oligomer on a substrate, whereby forming an interlayer insulating film made from a polymer in which the first monomer and the second monomer are three-dimensionally polymerized.

In the third method for forming an interlayer insulating film, the polymer composing the interlayer insulating film is made from carbon and hydrogen alone and includes neither nitrogen nor oxygen. Therefore, the polymer has small polarizability, so that the dielectric constant of the interlayer insulating film can be low and its hygroscopicity can be small. Furthermore, since the interlayer insulating film has a low dielectric constant, there is no need to further reduce the density, and hence, degradation of the mechanical strength can be avoided.

The fourth method for forming an interlayer insulating film of this invention includes the steps of preparing an oligomer by polymerizing, in a gas phase, a first monomer having four substituted acetylenyl groups and polymerizable in the two-dimensional direction and a second monomer having two substituted cyclopentanonyl groups and polymerizable in the three-dimensional direction; and causing polymerization after depositing the oligomer on a substrate, whereby forming an interlayer insulating film made from a polymer in which the first monomer and the second monomer are three-dimensionally polymerized.

In the fourth method for forming an interlayer insulating film, the polymer composing the interlayer insulating film is made from carbon and hydrogen alone and includes neither nitrogen nor oxygen. Therefore, the polymer has small polarizability, so that the dielectric constant of the interlayer insulating film can be low and its hygroscopicity can be small. Furthermore, since the interlayer insulating film has a low dielectric constant, there is no need to further reduce the density, and hence, degradation of the mechanical strength can be avoided.

In the fourth method for forming an interlayer insulating film, polymerization performed in a gas phase for preparing the oligomer can be a thermal polymerization reaction or a plasma polymerization reaction.

In the third or fourth method for forming an interlayer insulating film, the first monomer can be an aromatic derivative having four substituted acetylenyl groups.

In the third or fourth method for forming an interlayer insulating film, the second monomer can be an adamantane derivative having two substituted cyclopentanonyl groups or a methane derivative having two substituted cyclopentanonyl groups.

In the third or fourth method for forming an interlayer insulating film, a substituent of the substituted acetylenyl group can be an aromatic derivative.

In the third or fourth method for forming an interlayer insulating film, a substituent of the substituted cyclopentanonyl group can be an aromatic derivative.

In the case where the substituent is an aromatic derivative, the aromatic derivative can be benzene, naphthalene, anthracene or biphenyl.

The first polymer composition of this invention is composed of a first monomer having four substituted acetylenyl groups and polymerizable in the three-dimensional direction and a second monomer having two substituted cyclopentanonyl groups and polymerizable in the two-dimensional direction that are three-dimensionally polymerized.

The first polymer composition is made from carbon and hydrogen alone and includes neither nitrogen nor oxygen. Therefore, the polymer composition has small polarizability, so that the dielectric constant thereof can be low and the hygroscopicity thereof can be small. Furthermore, since the polymer composition has a low dielectric constant, there is no need to further reduce the density, and hence, degradation of the mechanical strength can be avoided.

In the first polymer composition, the first monomer can be an adamantane derivative having four substituted acetylenyl groups or a methane derivative having four substituted acetylenyl groups.

In the first polymer composition, the second monomer can be an aromatic derivative having two substituted cyclopentanonyl groups.

The second polymer composition of this invention is composed of a first monomer having four substituted acetylenyl groups and polymerizable in the two-dimensional direction and a second monomer having two substituted cyclopentanonyl groups and polymerizable in the three-dimensional direction that are three-dimensionally polymerized.

The second polymer composition is made from carbon and hydrogen alone and includes neither nitrogen nor oxygen. Therefore, the polymer composition has small polarizability, so that the dielectric constant thereof can be low and the hygroscopicity thereof can be small. Furthermore, since the polymer composition has a low dielectric constant, there is no need to further reduce the density, and hence, degradation of the mechanical strength can be avoided.

In the second polymer composition, the first monomer can be an aromatic derivative having four substituted acetylenyl groups.

In the second polymer composition, the second monomer can be an adamantane derivative having two substituted cyclopentanonyl groups or a methane derivative having two substituted cyclopentanonyl groups.

DETAILED DESCRIPTION OF THE INVENTION

Embodiment 1

An interlayer insulating film, a method for forming the interlayer insulating film and a polymer composition according to Embodiment 1 of the invention will now be described.

Figure 4:
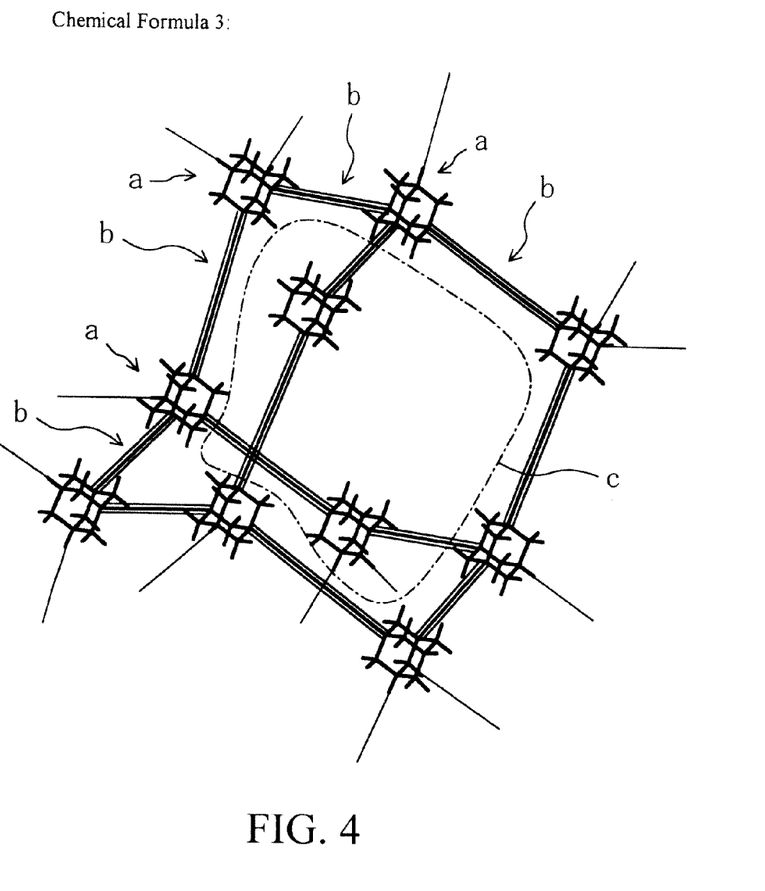
FIG. 4 is an illustration of chemical formula 3.

The interlayer insulating film or the polymer composition of Embodiment 1 is composed of a polymer represented by Chemical Formula 3, as shown in FIG. 4, in which a first monomer having four substituted acetylenyl groups and polymerizable in the three-dimensional direction as represented by Chemical Formula 1 and a second monomer having two substituted cyclopentanonyl groups and polymerizable in the two-dimensional direction as represented by Chemical Formula 2 are three-dimensionally polymerized:

Chemical Formula 1:

Chemical Formula 2:

In Chemical Formula 3, as shown in FIG. 4, a is the first monomer represented by Chemical Formula 1, b is the second monomer represented by Chemical Formula 2, and c is a pore of a molecular size formed within a diamond structure.

The first monomer has four substituted acetylenyl groups represented by a general formula, RC≡C— (wherein R is a substituent), and the substituent R may be hydrogen or an aromatic derivative such as benzene, naphthalene, anthracene or biphenyl.

Specific examples of the first monomer are an adamantane derivative having two substituted acetylenyl groups, such as 1,3,5,7-tetra(acetylenyl)adamantane, and a methane derivative having two substituted acetylenyl groups, such as tetra(acetylenyl)methane.

The second monomer has two substituted cyclopentanonyl groups represented by a general formula, Chemical Formula 4:

Chemical Formula 4:

wherein $R_1$, $R_2$ and $R_3$ are the same or different substituents, and each substituent may be hydrogen or an aromatic derivative such as benzene, naphthalene, anthracene or biphenyl.

A specific example of the second monomer is an aromatic derivative such as bis(cyclopentanonyl)benzene.

Figure 5:
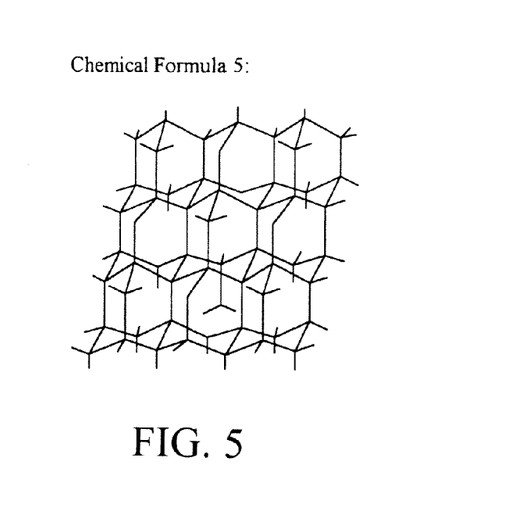
FIG. 5 is an illustration of chemical formula 5.

In the method for forming the interlayer insulating film of Embodiment 1, the first monomer represented by Chemical Formula 1 and the second monomer represented by Chemical Formula 2 are polymerized in a liquid phase, so as to form an oligomer represented by Chemical Formula 5, as shown in FIG. 5, and then, the oligomer is applied on a substrate and polymerization is caused. Thus, an interlayer insulating film made from a polymer obtained by three-dimensionally polymerizing the first monomer and the second monomer is formed.

Figure 1:
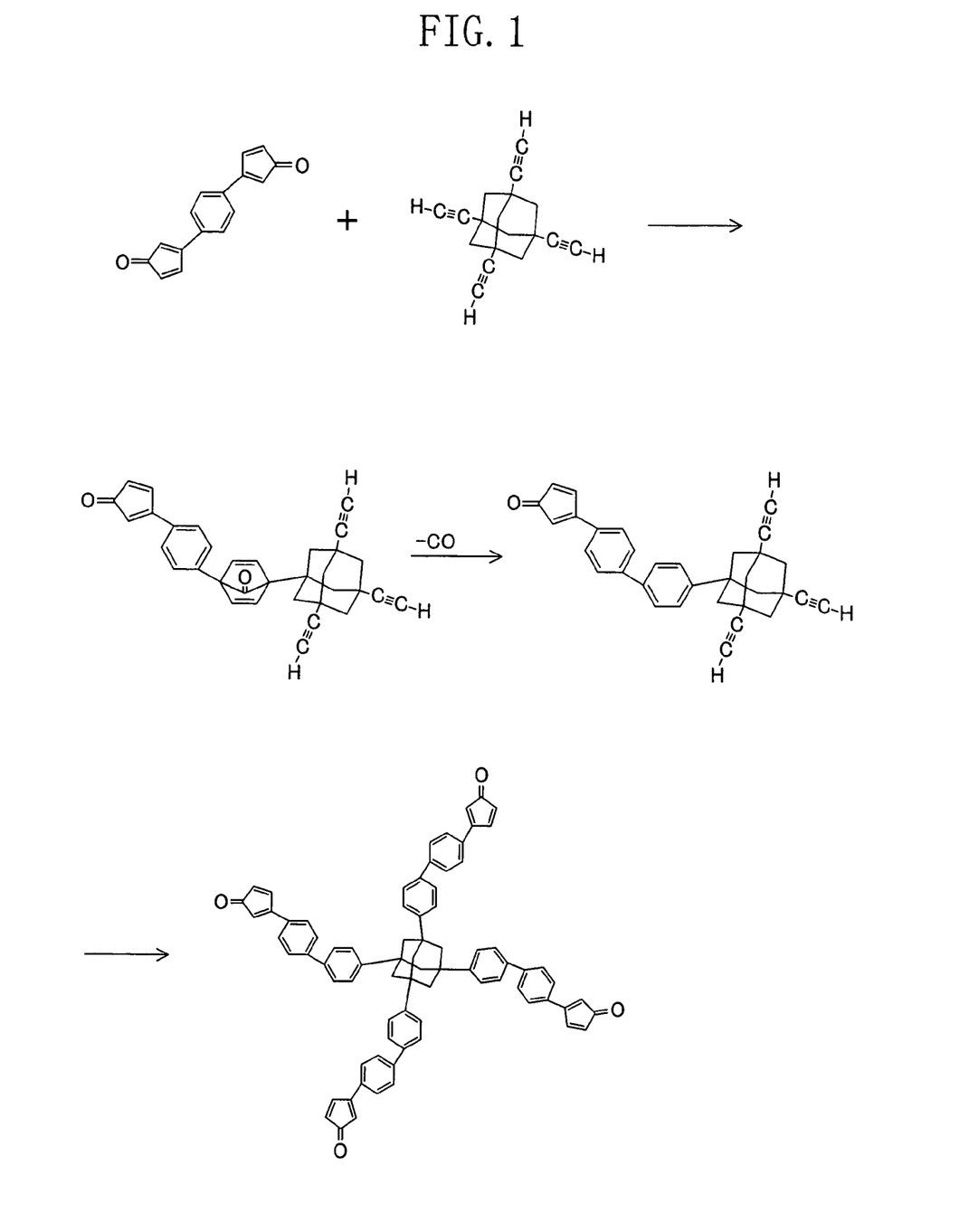
FIG. 1 is a diagram for showing a polymerization reaction system employed in a method for forming an interlayer insulating film according to Embodiment 1 or 3 of the invention.

Now, with reference to FIG. 1, a method for forming a polymer composition or an interlayer insulating film with a diamond structure in which the first monomer and the second monomer are three-dimensionally polymerized will be described by using 1,3,5,7-tetra(acetylenyl)adamantane and bis(cyclopentanonyl)benzene respectively as the first and second monomers. In this polymerization reaction, [4,2]-cycloaddition is used as a basic reaction system as shown in FIG. 1.

First, $1.4 \times 10^{-3}$ mol of 1,3,5,7-tetra(acetylenyl)adamantane (i.e., the first monomer) and $2.8 \times 10^{-3}$ mol of bis(cyclopentanonyl)benzene (i.e., the second monomer) are dissolved in a solvent of 100 ml of mesitylene, and the resulting solution is refluxed at a temperature of 160° C. in a nitrogen atmosphere in the dark. After a polymerization reaction is caused between the first monomer and the second monomer through the reflux for 1 hour, the solvent is distilled, and thereafter, the resulting solution is concentrated 10-fold so as to give a solution with a solid content of 10%. At this point, a polymer with a molecular weight of approximately 10000 is produced in the solution, and the solution is a polymer sol solution. Also at this point, the oligomer in which the first monomer and the second monomer are alternately copolymerized as represented by Chemical Formula 5, as shown in FIG. 5, is obtained.

Next, the polymer sol solution is cooled to room temperature, and the resultant is applied on a silicon substrate with a size of 8 inches by using a spin coater at a speed of rotation of 3000/min. Thereafter, the silicon substrate is allowed to stand for 30 seconds, is baked with a hot plate at a temperature of 160° C. for 1 minute and is annealed at a temperature of 400° C. for 30 minutes in a nitrogen atmosphere. In this manner, a low dielectric constant film with a thickness of 320 nm and a dielectric constant of 1.9 can be obtained.

Then, the low dielectric constant film is baked with a hot plate at a temperature of 160° C. so as to vaporize the mesitylene remaining in the film, and is then annealed at a temperature of 400° C. so as to cause a reaction of a reactive group remaining in the film. Thus, the polymerization is completed.

In the case where 1,3,5,7-tetra(acetylenyl)adamantane and bis(cyclopentanonyl)benzene used as the starting materials are included in the solution at a high concentration, there is a fear of collapse of the diamond structure, so that the resultant structure may have a high density. In contrast, in the case where the concentration of the starting materials is low and the reaction speed is low, formation of the diamond structure can be accelerated.

Furthermore, in order to definitely form the diamond structure, the reaction is preferably caused by adding a solution of 1,3,5,7-tetra(acetylenyl)adamantane little by little in a dropwise manner in the excessive presence of bis(cyclopentanonyl)benzene. In this manner, an addition reaction of four molecules of the bis(cyclopentanonyl)benzene to the 1,3,5,7-tetra(acetylenyl)adamantane introduced in a dropwise manner in the excessive presence of the bis(cyclopentanonyl) benzene is preferentially caused. Therefore, a linear polymerization reaction and an incomplete three-dimensional polymerization reaction can be avoided.

First, after a ¼ equivalent of 1,3,5,7-tetra(acetylenyl)adamantane is added dropwise to the bis(cyclopentanonyl)benzene, the addition is suspended for a while to keep the reaction, so as to complete the addition reaction of four molecules of the bis(cyclopentanonyl)benzene.

Next, after another ¼ equivalent of 1,3,5,7-tetra(acetylenyl)adamantane is slowly added dropwise to the bis(cyclopentanonyl)benzene, the addition is suspended for a while to keep the reaction, so as to complete an addition reaction of the dropped 1,3,5,7-tetra(acetylenyl)adamantane to the adduct in which the four molecules of bis(cyclopentanonyl)benzene have been added to the 1,3,5,7-tetra(acetylenyl)adamantane.

In this manner, an adduct with a diamond structure including 1,3,5,7-tetra(acetylenyl)adamantane and bis(cyclopentanonyl)benzene in a ratio of 1:2 is obtained.

A polymerization reaction of 1,3,5,7-tetra(acetylenyl)adamantane and a polymerization reaction of bis(cyclopentanonyl)benzene are proceeded merely in the presence of a metal catalyst or through light irradiation. Therefore, in Embodiment 1, the reaction occurs not thermally but as successive copolymerization, and in the other words, three-dimensional living polymerization is carried out. Since the three-dimensional living polymerization is thus employed, the polymerization reaction can be caused stoichiometrically with the three-dimensional structure controlled.

The polymerization of Embodiment 1 has been practically used as a method for synthesizing an interlayer insulating film made of an organic low dielectric constant film having a polyphenylene-based polymer structure.

This polyphenylene-based polymer has, however, polymers with a straight-chain structure as a main body, and these polymers are crosslinked. Therefore, its dielectric constant is approximately 2.6, and in order to further lower the dielectric constant, the porosity should be increased. When the porosity is increased, the mechanical strength is lowered as described above.

In contrast, the interlayer insulating film of Embodiment 1 is composed of the polymer composition in which the first monomer having the substituted acetylenyl groups and polymerizable in the three-dimensional direction and the second monomer having the substituted cyclopentanonyl groups and polymerizable in the two-dimensional direction are three- dimensionally polymerized. Accordingly, the diamond structure having a pore of a molecular size can be realized.

Embodiment 2

An interlayer insulating film, a method for forming the interlayer insulating film and a polymer composition according to Embodiment 2 of the invention will now be described.

Figure 6:
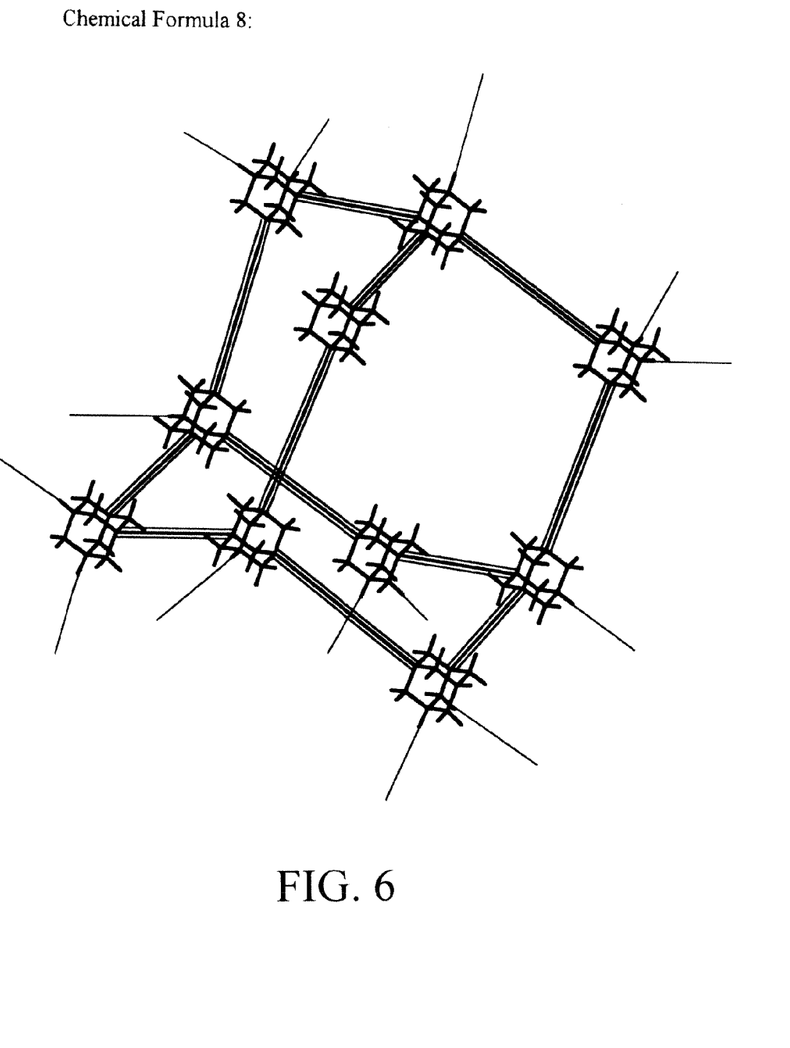
FIG. 6 is an illustration of chemical formula 8.

The interlayer insulating film or the polymer composition of Embodiment 2 is composed of a polymer represented by Chemical Formula 8, as shown in FIG. 6, in which a first monomer having two substituted acetylenyl groups and polymerizable in the two-dimensional direction as represented by Chemical Formula 6 and a second monomer having four substituted cyclopentanonyl groups and polymerizable in the three-dimensional direction as represented by Chemical Formula 7 are three-dimensionally polymerized:

Chemical Formula 6:

Chemical Formula 7:

The first monomer has the substituted acetylenyl groups represented by a general formula, RC≡C— (wherein R is a substituent), and the substituent R may be hydrogen or an aromatic derivative such as benzene, naphthalene, anthracene or biphenyl. A specific example of the first monomer is an aromatic derivative such as 1,3-bis(acetylenyl)benzene.

The second monomer has the substituted cyclopentanonyl groups represented by a general formula, Chemical Formula 9:

Chemical Formula 9:

wherein $R_1$, $R_2$ and $R_3$ are the same or different substituents, and each substituent may be hydrogen or an aromatic derivative such as benzene, naphthalene, anthracene or biphenyl.

Specific examples of the second monomer are an adamantane derivative such as 1,3,5,7-tetra(cyclopentanonyl)adamantane and a methane derivative such as tetra(cyclopentanonyl)methane.

Figure 7:
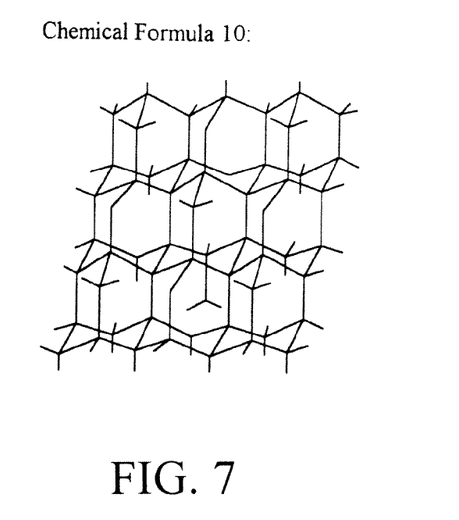
FIG. 7 is an illustration of chemical formula 10.

In the method for forming the interlayer insulating film of Embodiment 2, the first monomer represented by Chemical Formula 6 and the second monomer represented by Chemical Formula 7 are polymerized in a liquid phase, so as to form an oligomer represented by Chemical Formula 10, as shown in FIG. 7 and then, the oligomer is applied on a substrate and polymerization is caused. Thus, an interlayer insulating film made from a polymer obtained by three-dimensionally polymerizing the first monomer and the second monomer is formed.

Figure 2:
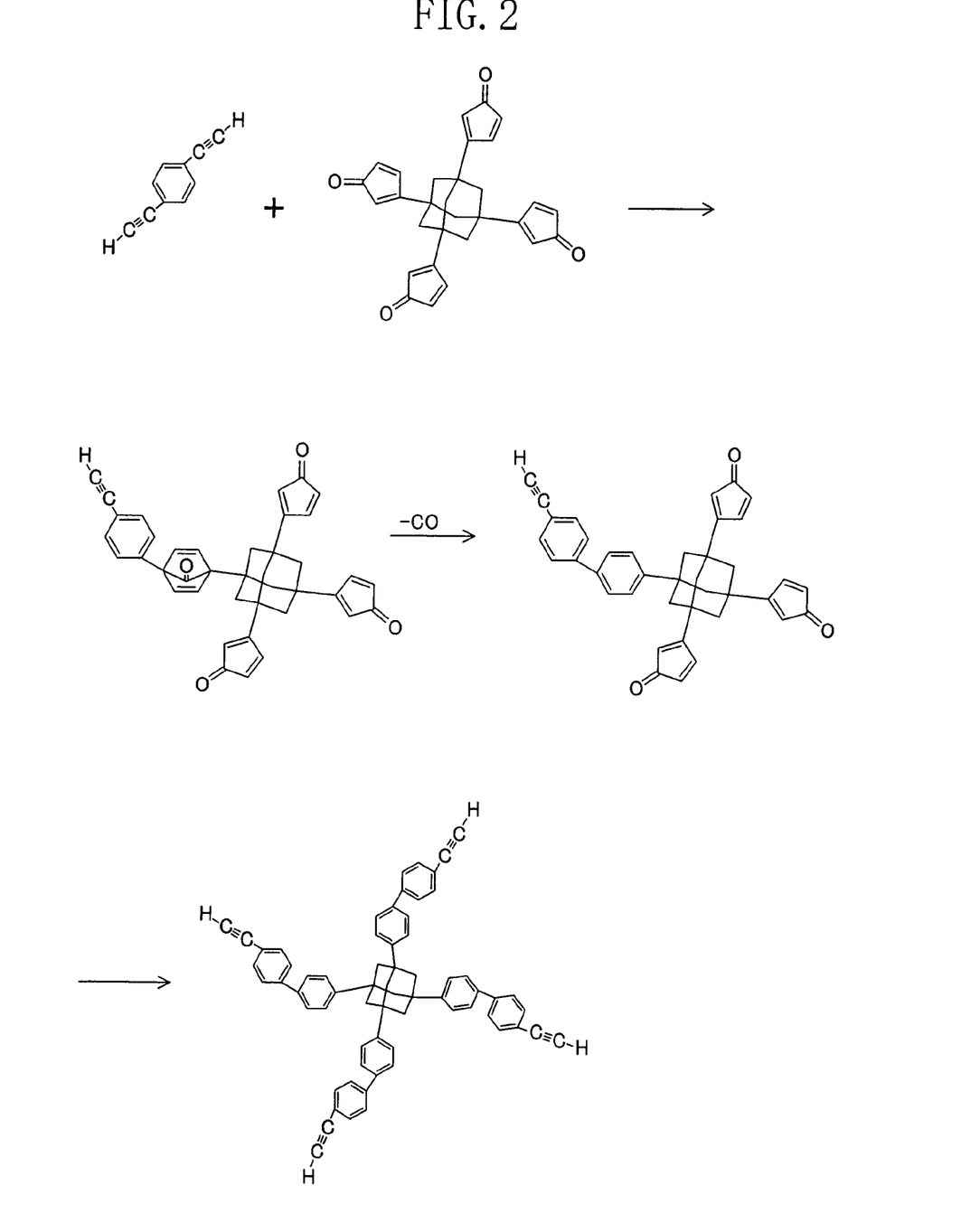
FIG. 2 is a diagram for showing a polymerization reaction system employed in a method for forming an interlayer insulating film according to Embodiment 2 or 4 of the invention.

Now, with reference to FIG. 2, a method for forming a polymer composition or an interlayer insulating film with a diamond structure in which the first monomer and the second monomer are three-dimensionally polymerized will be described by using 1,3-bis(acetylenyl)benzene and 1,3,5,7-tetra(cyclopentanonyl)adamantane respectively as the first and second monomers. In this polymerization reaction, [4,2]-cycloaddition is used as a basic reaction system as shown in FIG. 2.

First, $2.8 \times 10^{-3}$ mol of 1,3-bis(acetylenyl)benzene (i.e., the first monomer) and $1.4 \times 10^{-3}$ mol of 1,3,5,7-tetra(cyclopentanonyl)adamantane (i.e., the second monomer) are dissolved in a solvent of 100 ml of mesitylene, and the resulting solution is refluxed at a temperature of 160° C. in a nitrogen atmosphere in the dark. After a polymerization reaction is caused between the first monomer and the second monomer through the reflux for 1 hour, the solvent is distilled, and thereafter, the resulting solution is concentrated 10-fold so as to give a solution with a solid content of 10%. At this point, a polymer with a molecular weight of approximately 10000 is produced in the solution, and the solution is a polymer sol solution. Also at this point, the oligomer in which the first monomer and the second monomer are alternately copolymerized as represented by Chemical Formula 10, as shown in FIG. 7, is obtained.

Next, the polymer sol solution is cooled to room temperature, and the resulting solution is applied on a silicon substrate with a size of 8 inches by using a spin coater at a speed of rotation of 3000/min. Thereafter, the silicon substrate is allowed to stand for 30 seconds, is baked with a hot plate at a temperature of 160° C. for 1 minute and is annealed at a temperature of 400° C. for 30 minutes in a nitrogen atmosphere. In this manner, a low dielectric constant film with a thickness of 320 nm and a dielectric constant of 1.9 can be obtained.

Then, the low dielectric constant film is baked with a hot plate at a temperature of 160° C. so as to vaporize the mesitylene remaining in the film, and is then annealed at a temperature of 400° C. so as to cause a reaction of a reactive group remaining in the film. Thus, the polymerization is completed.

In the case where 1,3,5,7-tetra(cyclopentanonyl)adamantane and 1,3-bis(acetylenyl)benzene used as the starting materials are included in the solution at a high concentration, there is a fear of collapse of the diamond structure, so that the resultant structure may have a high density. In contrast, in the case where the concentration of the starting materials is low and the reaction speed is low, formation of the diamond structure can be accelerated.

Furthermore, in order to definitely form the diamond structure, the reaction is preferably caused by adding a solution of 1,3,5,7-tetra(cyclopentanonyl)adamantane little by little in a dropwise manner in the excessive presence of 1,3-bis(acetylenyl)benzene. In this manner, an addition reaction of four molecules of the 1,3-bis(acetylenyl)benzene to the 1,3,5,7-tetra(cyclopentanonyl)adamantane introduced in a dropwise manner in the excessive presence of the 1,3-bis(acetylenyl) benzene is preferentially caused. Therefore, a linear polymerization reaction and an incomplete three-dimensional polymerization reaction can be avoided.

First, after a ¼ equivalent of 1,3,5,7-tetra(cyclopentanonyl)adamantane is added dropwise to the 1,3-bis(acetylenyl)benzene, the addition is suspended for a while to keep the reaction, so as to complete the addition reaction of four molecules of the 1,3-bis(acetylenyl)benzene.

Next, after another ¼ equivalent of 1,3,5,7-tetra(cyclopentanonyl)adamantane is slowly added dropwise to the 1,3-bis(acetylenyl)benzene, the addition is suspended for a while to keep the reaction, so as to complete an addition reaction of the dropped 1,3,5,7-tetra(cyclopentanonyl)adamantane to the adduct in which the four molecules of 1,3-bis(acetylenyl)benzene have been added to the 1,3,5,7-tetra(cyclopentanonyl)adamantane.

In this manner, an adduct with a diamond structure including 1,3,5,7-tetra(cyclopentanonyl)adamantane and 1,3-bis(acetylenyl)benzene in a ratio of 1:2 is obtained.

A polymerization reaction of 1,3,5,7-tetra(cyclopentanonyl)adamantane and a polymerization reaction of 1,3-bis(acetylenyl)benzene are proceeded merely in the presence of a metal catalyst or through light irradiation. Therefore, in Embodiment 2, the reaction occurs not thermally but as successive copolymerization, and in the other words, three-dimensional living polymerization is carried out. Since the three-dimensional living polymerization is thus employed, the polymerization reaction can be caused stoichiometrically with the three-dimensional structure controlled.

The polymerization of Embodiment 2 has been practically used as a method for synthesizing an interlayer insulating film made of an organic low dielectric constant film having a polyphenylene-based polymer structure.

This polyphenylene-based polymer has, however, polymers with a straight-chain structure as a main body, and these polymers are crosslinked. Therefore, its dielectric constant is approximately 2.6, and in order to further lower the dielectric constant, the porosity should be increased. When the porosity is increased, the mechanical strength is lowered as described above.

In contrast, the interlayer insulating film of Embodiment 2 is composed of the polymer composition in which the first monomer having four substituted acetylenyl groups and polymerizable in the two-dimensional direction and the second monomer having two substituted cyclopentanonyl groups and polymerizable in the three-dimensional direction are three-dimensionally polymerized. Accordingly, the diamond structure having a pore of a molecular size can be realized.

Embodiment 3

An interlayer insulating film, a method for forming the interlayer insulating film and a polymer composition according to Embodiment 3 of the invention will now be described.

The interlayer insulating film or the polymer composition of Embodiment 3 is composed of a polymer in which a first monomer having four substituted acetylenyl groups and polymerizable in the three-dimensional direction and a second monomer having two substituted cyclopentanonyl groups and polymerizable in the two-dimensional direction are three-dimensionally polymerized in the same manner as in Embodiment 1. Accordingly, the description of the first monomer and the second monomer is omitted in this embodiment.

While the polymerization is carried out in a liquid phase in Embodiment 1, the polymerization is carried out in a gas phase in Embodiment 3.

Now, the outline of a diode parallel plate CVD system used in the polymerization carried out in a gas phase will be described with reference to FIG. 3.

Figure 3:
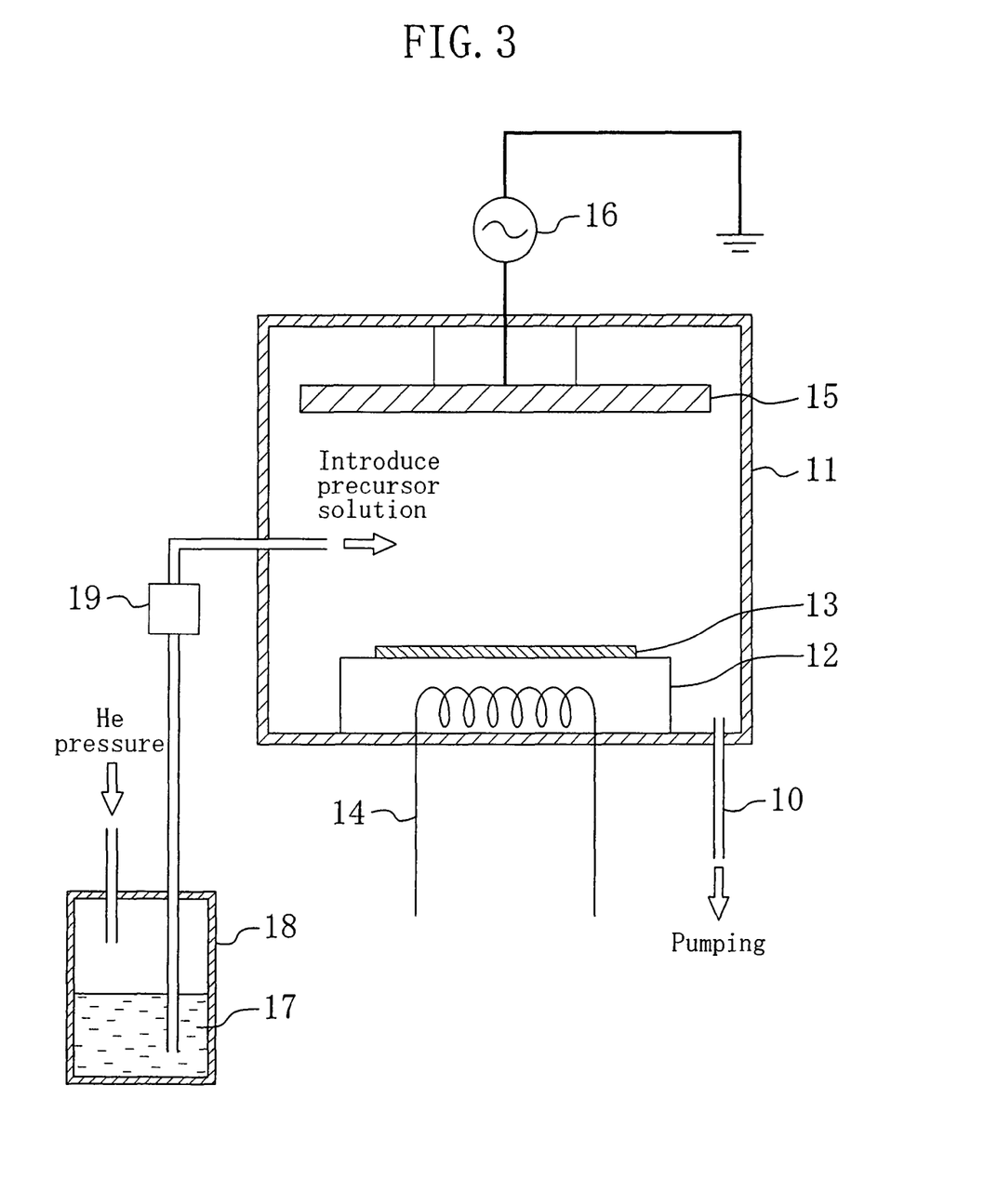
FIG. 3 is a schematic diagram of a diode parallel plate CVD system used in the method for forming an interlayer insulating film according to Embodiment 3 or 4 of the invention.

As shown in FIG. 3, a sample table 12 corresponding to a lower electrode is provided in a lower portion of a chamber 11 that is kept in vacuum by a vacuum pumping system 10, and a semiconductor wafer 13 is held on the sample table 12. The sample table 12 is provided with heating means 14. A counter electrode 15 is provided in an upper portion of the chamber 11, and RF power is applied to the counter electrode 15 by an RF power source 16, so that plasma discharge can be caused within the chamber 11.

A helium gas is supplied to a pressure vessel 18 containing a precursor solution 17, so that the precursor solution 17 can be supplied into the chamber 11 through a massflow 19 by using the pressure of the helium gas.

In the method for forming an interlayer insulating film of Embodiment 3, the first monomer represented by Chemical Formula 1 and the second monomer represented by Chemical Formula 2 are polymerized in a gas phase, so as to form an oligomer represented by Chemical Formula 5, as shown in FIG. 5, and then, the oligomer is deposited on a substrate and polymerization is caused. Thus, an interlayer insulating film made from a polymer obtained by three-dimensionally polymerizing the first monomer and the second monomer is formed.

Now, with reference to FIG. 1, a method for forming a polymer composition or an interlayer insulating film with a diamond structure in which the first monomer and the second monomer are three-dimensionally polymerized will be described by using 1,3,5,7-tetra(acetylenyl)adamantane and bis(cyclopentanonyl)benzene respectively as the first and second monomers. In this polymerization reaction, [4,2]-cycloaddition is used as a basic reaction system as shown in FIG. 1.

First, a mixture of 1,3,5,7-tetra(acetylenyl)adamantane (i.e., the first monomer) and bis(cyclopentanonyl)benzene (i.e., the second monomer) is dissolved in, for example, 1000 ml of mesitylene so as to give a precursor solution. In this case, $1.4 \times 10^{-2}$ mol of 1,3,5,7-tetra(acetylenyl)adamantane and $2.8 \times 10^{-2}$ mol of bis(cyclopentanonyl)benzene are dissolved in the mesitylene solution, so as to adjust the solid content of the resultant solution to approximately 10%. In order to obtain a diamond structure, the molar ratio between the 1,3,5,7-tetra(acetylenyl)adamantane and the bis(cyclopentanonyl)benzene is set to 1:2.

Next, the precursor solution 17 is supplied to the pressure vessel 18 so as to be supplied into the chamber 11 of the CVD system by using the pressure of, for example, a helium gas. For example, the pressure within the chamber 11 is set to 665 Pa for supplying the precursor solution 17 into the chamber 11 at 10 ml/min., and a helium gas is used as a diluent gas. Also, the temperature of the semiconductor wafer 13 held on the sample table 12 is set to 400° C. by the heating means 14.

When the processing is carried out under the aforementioned conditions for 3 minutes, a low dielectric constant film with a thickness of 250 nm is deposited on the semiconductor wafer 13. The dielectric constant of the low dielectric constant film measured through CV measurement using an Hg probe is 2.4.

The dielectric constant is higher than that attained by the polymerization carried out in a liquid phase as described in Embodiment 1 probably because the reaction system is incompletely controlled. Specifically, it seems, in the thermal CVD employed in Embodiment 3, that since the mixed solution of the 1,3,5,7-tetra(acetylenyl)adamantane and the bis(cyclopentanonyl)benzene is used as the precursor solution, the polymerization is randomly caused between the first monomer and the second monomer, and hence it is difficult to obtain a regular structure.

Therefore, preferably, two kinds of precursor solutions respectively obtained by dissolving 1,3,5,7-tetra(acetylenyl)adamantane and bis(cyclopentanonyl)benzene in mesitylene are separately prepared, so that these precursor solutions can be separately supplied into the chamber 11. This will now be described.

First, 1 ml of the precursor solution of 1,3,5,7-tetra(acetylenyl)adamantane is supplied into the chamber 11. Thereafter, 1 ml of the precursor solution of bis(cyclopentanonyl)benzene of a half equivalent to the unimolecular adsorption amount is supplied into the chamber 11. Such an operation for alternately supplying the precursor solutions of the 1,3,5,7-tetra(acetylenyl)adamantane and the bis(cyclopentanonyl)benzene into the chamber 11 is repeatedly performed. For example, 1 ml each of the respective precursor solutions are alternately supplied five times each during 3 minutes, so as to supply 10 ml in total of the precursor solutions. When the precursor solutions are alternately supplied in this manner, a regular diamond structure can be obtained, and the resultant low dielectric constant film has a dielectric constant of 1.9.

When the polymerization is carried out by plasma CVD instead of the thermal CVD, the deposition speed can be improved. Specifically, RF power of 13.56 MHz is applied to the parallel plate counter electrode 15 at 50 W with the sample table 12 grounded, so as to deposit a low dielectric constant film while causing plasma discharge. The other conditions to be employed in this case are the same as those employed in the thermal CVD. When the polymerization is thus carried out by the plasma CVD, the deposition speed is 1.5 times as high as that attained in the thermal CVD.

Embodiment 4

An interlayer insulating film, a method for forming the interlayer insulating film and a polymer composition according to Embodiment 4 of the invention will now be described.

The interlayer insulating film or the polymer composition of Embodiment 4 is composed of a polymer in which a first monomer having four substituted acetylenyl groups and polymerizable in the two-dimensional direction and a second monomer having two substituted cyclopentanonyl groups and polymerizable in the three-dimensional direction are three-dimensionally polymerized in the same manner as in Embodiment 2. Accordingly, the description of the first monomer and the second monomer is omitted in this embodiment.

While the polymerization is carried out in a liquid phase in Embodiment 2, the polymerization is carried out in a gas phase in Embodiment 4. Also, a diode parallel plate CVD system used in this polymerization carried out in a gas phase is the same as that described in Embodiment 3 and hence the description is omitted.

In the method for forming an interlayer insulating film of Embodiment 4, the first monomer represented by Chemical Formula 6 and the second monomer represented by Chemical Formula 7 are polymerized in a gas phase, so as to form an oligomer represented by Chemical Formula 10, as shown in FIG. 7, and then, the oligomer is deposited on a substrate and polymerization is caused. Thus, an interlayer insulating film made from a polymer obtained by three-dimensionally polymerizing the first monomer and the second monomer is formed.

Now, with reference to FIG. 2, a method for forming a polymer composition or an interlayer insulating film with a diamond structure in which the first monomer and the second monomer are three-dimensionally polymerized will be described by using bis(acetylenyl)benzene and 1,3,5,7-tetra(cyclopentanonyl)adamantane respectively as the first and second monomers. In this polymerization reaction, [4,2]-cycloaddition is used as a basic reaction system as shown in FIG. 2.

First, a mixture of bis(acetylenyl)benzene (i.e., the first monomer) and 1,3,5,7-tetra(cyclopentanonyl)adamantane (i.e., the second monomer) is dissolved in, for example, 1000 ml of mesitylene so as to give a precursor solution. In this case, $2.8 \times 10^{-2}$ mol of bis(acetylenyl)benzene and $1.4 \times 10^{-2}$ mol of 1,3,5,7-tetra(cyclopentanonyl)adamantane are dissolved in the mesitylene solution, so as to adjust the solid content of the resultant solution to approximately 10%. In order to obtain a diamond structure, the molar ratio between the bis(acetylenyl)benzene and the 1,3,5,7-tetra(cyclopentanonyl)adamantane is set to 2:1.

Next, the precursor solution 17 is supplied to the pressure vessel 18 so as to be supplied into the chamber 11 of the CVD system by using the pressure of, for example, a helium gas. For example, the pressure within the chamber 11 is set to 665 Pa for supplying the precursor solution 17 into the chamber 11 at 10 ml/min., and a helium gas is used as a diluent gas. Also, the temperature of the semiconductor wafer 13 held on the sample table 12 is set to 400° C. by the heating means 14.

When the processing is carried out under the aforementioned conditions for 3 minutes, a low dielectric constant film with a thickness of 250 nm is deposited on the semiconductor wafer 13. The dielectric constant of the low dielectric constant film measured through the CV measurement using an Hg probe is 2.4.

The dielectric constant is higher than that attained by the polymerization carried out in a liquid phase as described in Embodiment 2 probably because the reaction system is incompletely controlled. Specifically, it seems, in the thermal CVD employed in Embodiment 4, that since the mixed solution of the bis(acetylenyl)benzene and the 1,3,5,7-tetra(cyclopentanonyl)adamantane is used as the precursor solution, the polymerization is randomly caused between the first monomer and the second monomer, and hence it is difficult to obtain a regular structure.

Therefore, preferably, two kinds of precursor solutions respectively obtained by dissolving bis(acetylenyl)benzene and 1,3,5,7-tetra(cyclopentanonyl)adamantane in mesitylene are separately prepared, so that these precursor solutions can be separately supplied into the chamber 11. This will now be described.

First, 1 ml of the precursor solution of 1,3,5,7-tetra(cyclopentanonyl)adamantane is supplied into the chamber 11. Thereafter, 1 ml of the precursor solution of bis(acetylenyl)benzene of a half equivalent to the unimolecular adsorption amount is supplied into the chamber 11. Such an operation for alternately supplying the precursor solutions of the 1,3,5,7-tetra(cyclopentanonyl)adamantane and the bis(acetylenyl)benzene into the chamber 11 is repeatedly performed. For example, 1 ml each of the respective precursor solutions are alternately supplied five times each during 3 minutes, so as to supply 10 ml in total of the precursor solutions. When the precursor solutions are alternately supplied in this manner, a regular diamond structure can be obtained, and the resultant low dielectric constant film has a dielectric constant of 1.9.

When the polymerization is carried out by plasma CVD instead of the thermal CVD, the deposition speed can be improved. Specifically, RF power of 13.56 MHz is applied to the parallel plate counter electrode 15 at 50 W with the sample table 12 grounded, so as to deposit a low dielectric constant film while causing plasma discharge. The other conditions to be employed in this case are the same as those employed in the thermal CVD. When the polymerization is thus carried out by the plasma CVD, the deposition speed is 1.5 times as high as that attained in the thermal CVD.

What is claimed is:

1. An interlayer insulating film comprising: a polymer in which a first monomer having two substituted acetylenyl groups and polymerizable in the two-dimensional direction and a second monomer having three substituted cyclopentanonyl groups and polymerizable in the three-dimensional direction are three-dimensionally polymerized.

2. The interlayer insulating film of claim 1, wherein said first monomer is an aromatic derivative having two substituted acetylenyl groups.

3. The interlayer insulating film of claim 1, wherein said second monomer is an adamantane derivative having three substituted cyclopentanonyl groups.

4. The interlayer insulating film of claim 1, wherein said second monomer is a methane derivative having three substituted cyclopentanonyl groups.

* * * * *